United States Patent
Bing et al.

(10) Patent No.: US 8,243,210 B2
(45) Date of Patent: Aug. 14, 2012

(54) APPARATUS AND METHOD FOR AMBIENT LIGHT ADAPTIVE COLOR CORRECTION

(75) Inventors: Han Bing, Yongin-si (KR); Du-sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1066 days.

(21) Appl. No.: 11/878,783

(22) Filed: Jul. 26, 2007

(65) Prior Publication Data

US 2008/0165292 A1 Jul. 10, 2008

(30) Foreign Application Priority Data

Jan. 4, 2007 (KR) .................. 10-2007-0001089

(51) Int. Cl.
*H04N 5/64* (2006.01)
*G06K 9/00* (2006.01)
*G09G 5/00* (2006.01)

(52) U.S. Cl. .................. 348/744; 382/167; 345/156

(58) Field of Classification Search .................. None
See application file for complete search history.

(56) References Cited

U.S. PATENT DOCUMENTS

| | | | | |
|---|---|---|---|---|
| 2003/0011563 A1* | 1/2003 | Wada | ............... | 345/156 |
| 2003/0020725 A1 | 1/2003 | Matsuda | | |
| 2003/0164927 A1 | 9/2003 | Tsukada | | |
| 2005/0001936 A1 | 1/2005 | Mao | | |
| 2007/0110304 A1* | 5/2007 | Tsukada | ............... | 382/167 |

FOREIGN PATENT DOCUMENTS

| | | |
|---|---|---|
| EP | 0 630 160 A2 | 12/1994 |
| EP | 1 150 159 A1 | 10/2001 |
| EP | 1 178 680 A2 | 2/2002 |
| JP | 10108031 | 4/1998 |
| JP | 1175048 | 7/1999 |
| JP | 2000-066166 | 3/2000 |
| JP | 2002-094791 | 3/2002 |
| KR | 1020000010406 | 2/2000 |

OTHER PUBLICATIONS

Office Action dated Jan. 31, 2008 in corresponding Korean Patent Application No. 10-2007-0001089 (4 pages).
European Search Report for 08100070.5, mailed Mar. 29, 2012.

* cited by examiner

*Primary Examiner* — Jefferey Harold
*Assistant Examiner* — Sean Haiem
(74) *Attorney, Agent, or Firm* — Staas & Halsey LLP

(57) ABSTRACT

An ambient light adaptive color correction system and method are provided in the present invention. Firstly, a color information sensor measures color information of at least black and white reference images on a projector plane with influence of ambient light. Then a color correction information calculator calculates color correction information for color appearance matching and gamut mapping based on the measured color information and a projector profile. And after pre-calculation, an image data correction unit processes an input image according to the color correction information to produce a corrected-color image to be outputted to the projector. Accordingly, the output image displayed on the projection plane with influence of ambient light will have a close color appearance to that in the dark room.

26 Claims, 6 Drawing Sheets
(2 of 6 Drawing Sheet(s) Filed in Color)

APPARATUS AND METHOD FOR AMBIENT LIGHT ADAPTIVE COLOR CORRECTION

CROSS-REFERENCE TO RELATED APPLICATION

This application is based on and claims priority from Korean Patent Application No. 10-2007-0001089 filed on Jan. 4, 2007, in the Korean Intellectual Property Office, the disclosure of which is incorporated herein in its entirety by reference.

BACKGROUND OF THE INVENTION

1. Field of the Invention

The present invention relates to a color correction apparatus and method for color correction. More particularly, the present invention relates to an apparatus and method for ambient light adaptive color correction.

2. Description of the Related Art

The application of digital projector has been expanded rapidly in the past few years. In particular, the development of LCD (Liquid Crystal Display) and DLP (Digital Light Processing) technology enables manufacturers produce projectors which are portable for not only business use but also personal home theatre. The typical visual environment for conventional projector is to project images on a projection plane in a dark room. As its application being widened, the demand for using projectors in normal light conditions such as office working environment and sunlight rays is growing more and more. Therefore, good color reproduction performance of a projector with consideration of ambient light effects is highly desired.

Japanese Patent No. 2973477 discloses a conventional projector, which detects the color and brightness of the projection planes and adjusts the white balance and brightness based on the detected color and brightness information. Therefore, the color reproduction is achieved by matching reproduced color to the target color values calorimetrically without consideration of color appearance of images. However, since the human color perception is complicated and the color appearance is frequently affected by the view environment and white color, the color appearance matching of the whole image would be desired rather than simple colorimetrical matching method under different lighting environment.

Further, Japanese Patent Application Unexamined publication No. 2001-320725 discloses an environment adaptive projector invented by Seiko Epson Corp, which uses a color sensor to measure the color information such as RGB or XYZ values from the projection plane on which a white image is projected with the influence of ambient light. Then, a complementary color, which is output as a corrected color, can be generated in CIELAB color space. Such a color correction can be repeatedly performed for plural levels of grey and the results are stored in a gamma-correction lookup table.

However, the above adaptive projector cannot always obtain satisfactory color reproduction due to the following reasons: 1. Even if a complementary color to the white color is projected on a projection plane, its reproduced color on the projection plane is not always a grey or achromatic color because of "chromatic grey" phenomenon. 2. More importantly, as to colors other than achromatic colors, subjected to the color correction using the complementary color pair, it does not ensure that the color appearance of such color becomes desired color appearance. Therefore, it can't achieve color appearance matching under different illumination conditions.

As described above, the prior patents haven't provided a color correction method of achieving color appearance matching. Also, the above patents haven't taken the gamut mapping into consideration. However, in fact the displayable color gamut of the projector can be affected significantly under influence of different external lighting environment. Consequently, the color appearance of the obtained corrected images in lighting room can't be closed to that in the dark room and can't be satisfied either.

SUMMARY OF THE INVENTION

The present invention is conceived to solve the above problems. Accordingly, an object of the present invention is to provide an apparatus and method for ambient light adaptive color correction using color appearance matching and gamut mapping.

Another object of the present invention is to provide an apparatus and method for ambient light adaptive color correction to get a color appearance similar to the projection images in the desired dark room.

A further object of the present invention is to get an outputted image with accurate hue and relatively brighter luminance after correction.

According to one aspect of the present invention, there is provided an apparatus for ambient light adaptive color correction, the apparatus including a color information sensor for measuring color information of at least black and white reference images on a projector plane with influence of ambient light, a color correction information calculator for calculating color correction information for color appearance matching and gamut mapping based on the measured color information and a projector profile, and an image data correction unit for processing an input image according to the color correction information to produce a corrected-color image to be outputted to the projector.

According to another aspect of the present invention, there is provided a method for ambient light adaptive color correction, the method including measuring color information of at least black and white reference images on a projector plane with influence of ambient light, calculating color correction information for color appearance matching and gamut mapping based on the measured color information and a projector profile, and processing an input image according to the color correction information to produce a corrected-color image to be outputted to the projector.

Particulars of other embodiments are incorporated in the following description and attached drawings.

BRIEF DESCRIPTION OF THE DRAWINGS

The patent or application file contains at least one drawing executed in color. Copies of this patent or patent application publication with color drawing(s) will be provided by the Office upon request and Payment of the necessary fee. The above and other aspects and features of the present invention will become readily apparent from the detailed description that follows, with reference to the accompanying drawings, in which.

DETAILED DESCRIPTION OF PREFERRED EMBODIMENTS

Figure 1:
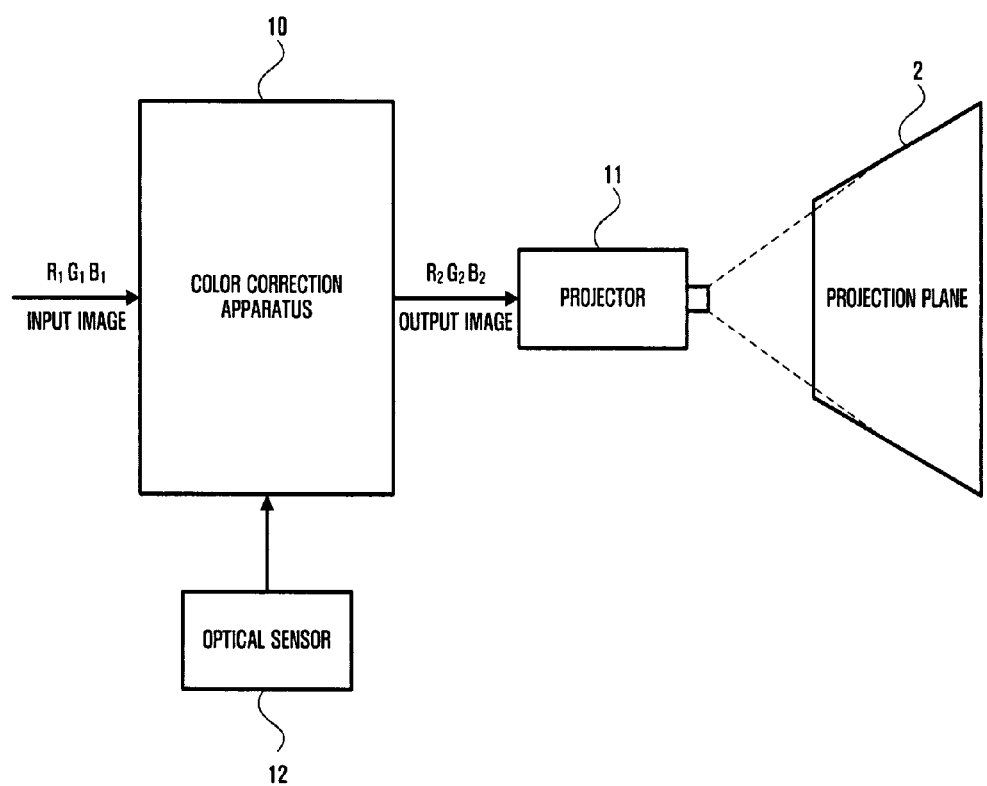
FIG. 1 is a schematic diagram illustrating a projector system including an ambient light adaptive color correction apparatus according to an embodiment of the present invention.

The present invention will now be described more fully with reference to the accompanying drawings, in which preferred embodiments of this invention are shown. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

FIG. 1 is a schematic diagram illustrating a projector system including an ambient light adaptive color correction apparatus according to an embodiment of the present invention. As shown in FIG. 1, a projector system comprises a projector 11 for emitting the colored light, a projection plane 2 on which a color image is projected, an optical sensor 12 for measuring the color information in consideration of external light, the color correction apparatus 10 receives input image data and generates the corrected image data to the projector 11 based on the color information sensed by the optical sensor 12.

Figure 2:
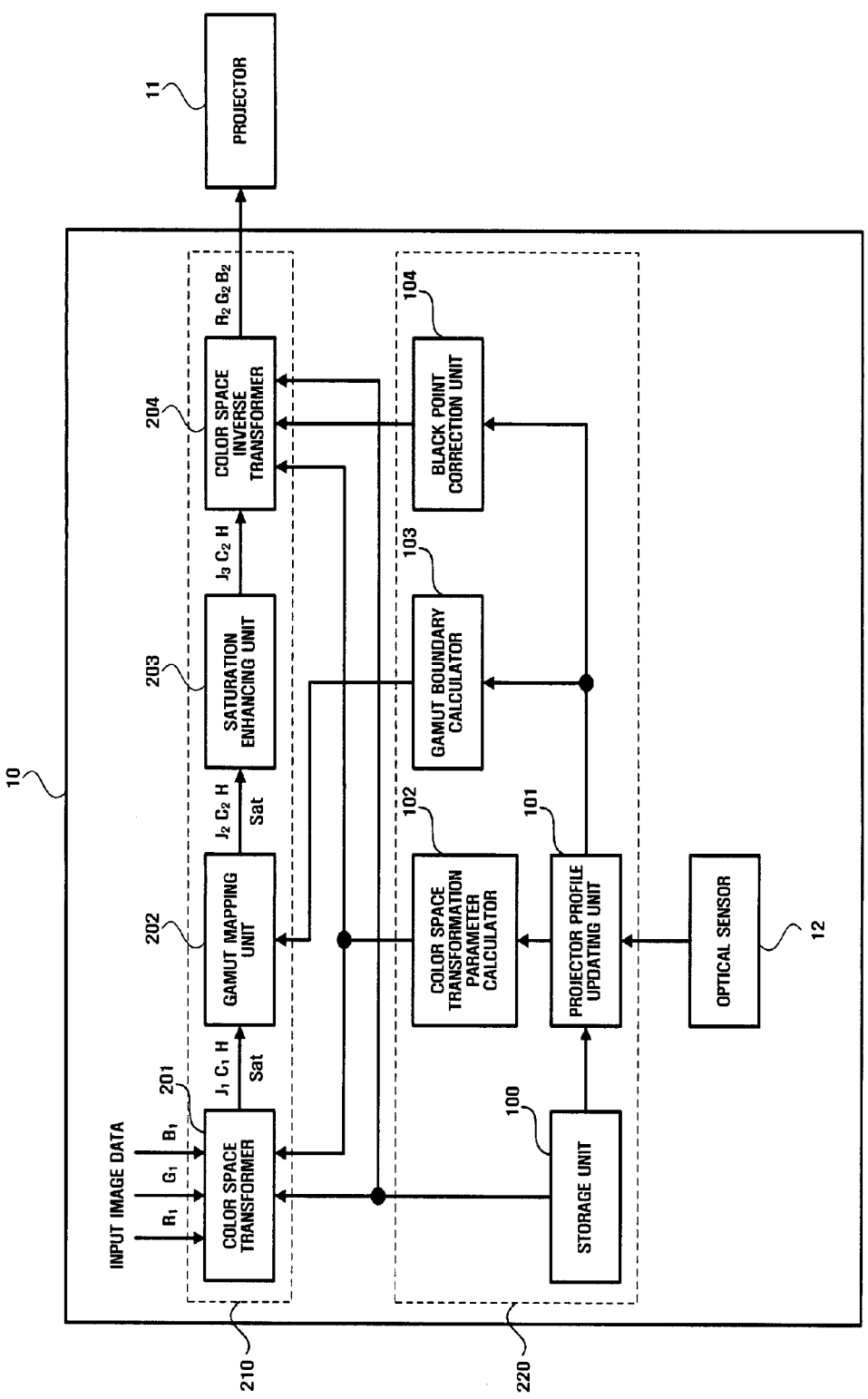
FIG. 2 is a block diagram illustrating the ambient light adaptive color correction apparatus in FIG. 1 according to an embodiment of the present invention.
Figure 3:
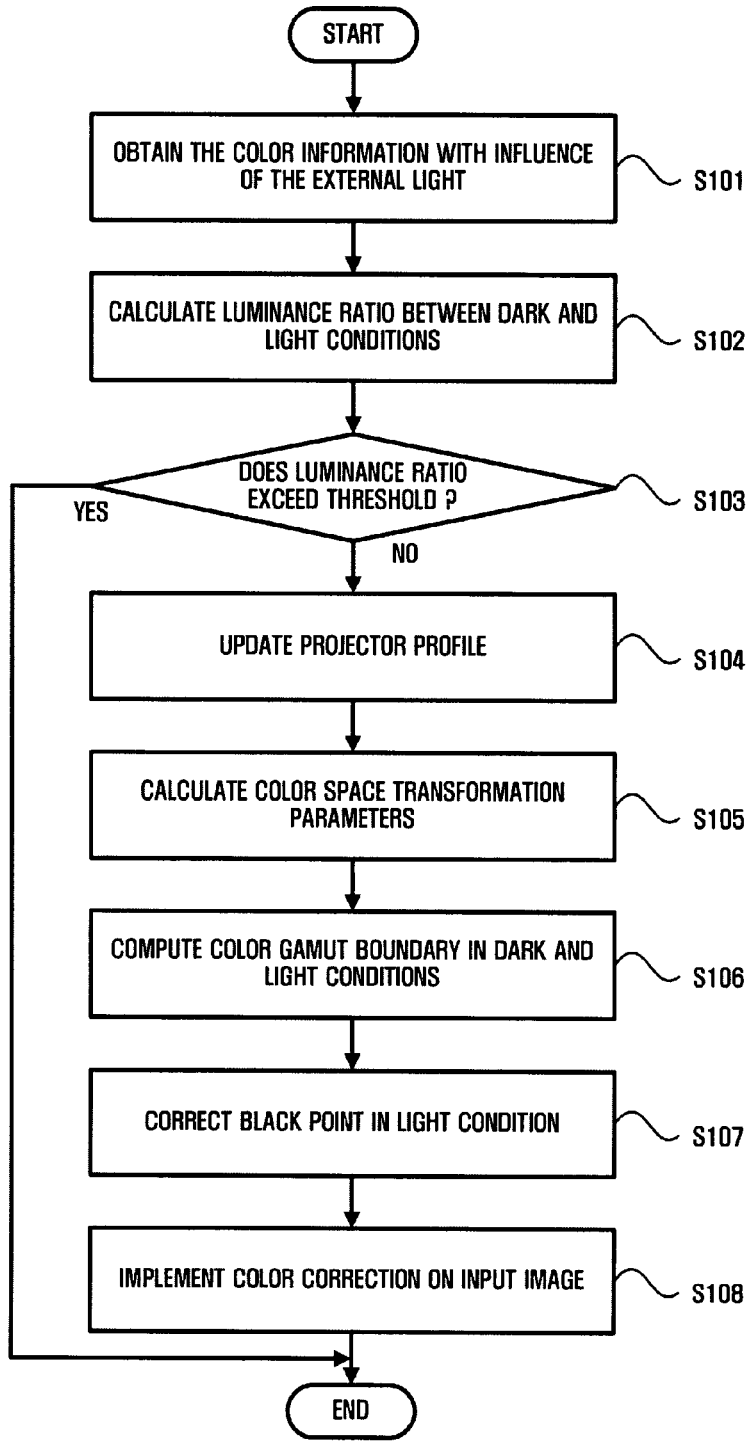
FIG. 3 is a flowchart illustrating a method for ambient light adaptive color correction according to an embodiment of the present invention.

More specially, as shown in the FIG. 2, the color correction apparatus 10 comprises two parts: a color correction information calculator 220 and an image data correction unit 210. The color correction information calculator 220 calculates color correction information based on the color information from the optical sensor 12 and the characteristics of the projector in the projector profile 100. And according to the above color correction information, the image data correction unit 210 processes the input image data to output the corrected color values to the projector 11.

The color correction information calculator 220 includes a storage unit 100 which stores a projector profile 100, projector profile updating unit 101 which updates projector profile, color space transformation parameter calculator 102 which calculates color space transformation parameters, gamut boundary calculator 103 which calculates gamut boundary, and black point correction unit 104 which corrects black point. The detailed operations of the color correction information calculator 220 will be described later.

The image data correction unit 210 receives and processes the input image by transferring the digital $R_1, G_1, B_1$ values of each pixel to the corrected $R_2, G_2, B_2$ values through a color space transformer 201, a gamut mapping unit 202, a saturation enhancing unit 203, and a color space inverse transformer 204. The color appearance matching with gamut mapping algorithm is applied in the image processing procedure to ensure the output image on the projection plane 2 with influence of ambient light will have a close color appearance to that in the dark room. The detailed operations of the image data correction unit 210 will be described later.

Hereinafter, an ambient light adaptive color correction method will be described in details with reference to the figures. Accordingly, the whole method can be divided into two parts in the embodiment: part I: color correction information calculation procedure illustrated with step S101-S106, and part II: image data correction procedure illustrated as step S201-S204.

Part I Color Correction Information Calculation

S101) Reference Images Measurement:

The present invention starts with the step of reference images measurement (S101), which is implemented to obtain the color information with influence of the external light. Several projection reference images are projected onto the projection plane 2. Then the optical sensor 12 captures and measures the chromaticity and luminance values of these images shown in the projection plane 2 with influence of external light. The white (W) and black (Bk) projection reference images are the least measurements required by the system in the present invention. And in the embodiment according to the present invention, the red (R), green (G) and blue (B) projection reference images are also measured to obtain their chromaticity and luminance values. Otherwise, the default chromaticity and luminance values of the R, G, B images stored in the storage unit 100 will taken as the color values of three primaries for projector.

S102) Calculating Luminance Ration Between Dark and Light Conditions

Subsequently, in step S102, the luminance ratio between dark and light conditions is calculated to decide whether color correction and image processing will be conducted under the light condition. Since the projection plane is a reflective material, there is physical limitation to the visibility of the projected images when the luminance of external light is beyond a certain range. According to the measured luminance values of white and black images in the light condition, the luminance ratio can be calculated as below:

$$\text{Luminance ratio} = Lwc/Lw \quad (1)$$

Wherein Lwc indicates the luminance level of white image in the light condition, which is measured in S101, and Lw indicates the luminance level of white image in the dark room, which can be calculated by subtracting black level in light condition (Lbkc, Lbkc is the luminance level of black image in the light condition measure in S101) from luminance of white image in light condition, i.e. Lw=Lwc−Lbkc. The projector profile updating unit 101 compares the size of the luminance ratio and that of a predetermined threshold S103, if the luminance ratio is greater than the threshold, then the user will be notified and the processing is terminated. The threshold can be set according to the projector used in practice.

S104) Updating Projector Profile

If the luminance ration is not greater than the threshold, then step of updating projector profile (S104) is implemented. Initially, the storage unit 100 (see FIG. 1) can store the LUTs (lookup tables) of the projector, the default chromaticity values of three primaries and color values of black for projector in a dark room or a desired target environment. Commonly the color information in a dark room is described as default values in the projector profile, however the values in a desired target environment is also can be set as the default values in the projector profile if the projector 11 will be always applied in a special target environment.

As described in step S101, in the case of measuring the reference images W and Bk only, the default color values of three primaries for projector 11 will be applied to calculate the followed color converting matrix when the white and black images are measured only. In this case the projector profile will be updated with the measured white and black values in the light condition only. Also when R, G, B, W and Bk images are all measured in the light condition, chromaticity values of three primaries for projector can be calculated by subtracting black level measured in the light condition from these measured color values of R, G and B in the same light condition. Table 1 illustrates an example of the measured CIE tristimulus values (X, Y, Z) of R, G, B, W and Bk five reference images in dark room and lighting room respectively.

TABLE 1

X, Y, Z values of reference projection images in dark and lighting room

|  | Dark room | | | Lighting room | | | | | |
|---|---|---|---|---|---|---|---|---|---|
|  | | | | Original measured | | | Black corrected | | |
|  | X | Y | Z | X | Y | Z | X-Xbk | Y-Ybk | Z-Zbk |
| White | 110.56 | 126.40 | 144.68 | 159.75 | 178.60 | 176.64 | 109.28 | 125.72 | 143.18 |
| Red | 67.80 | 30.35 | 0.58 | 116.89 | 82.05 | 34.09 | 66.42 | 29.17 | 0.63 |
| Green | 19.56 | 90.20 | 12.40 | 69.37 | 142.30 | 45.74 | 18.90 | 89.42 | 12.28 |
| Blue | 23.20 | 6.02 | 131.64 | 73.30 | 58.56 | 164.79 | 22.83 | 5.68 | 131.33 |
| Black | 0.15 | 0.16 | 0.13 | 50.47 | 52.88 | 33.47 | 0.00 | 0.00 | 0.00 |

From table 1, we can find the influence of external light on colors can be evaluated by measuring a black image on projection plane 2 in the light condition. The newly calculated chromaticity values of R, G and B will overwrite those default values in projector profile. Meanwhile, projector profile will be updated with the color values of white and black in the light condition.

Figure 5:
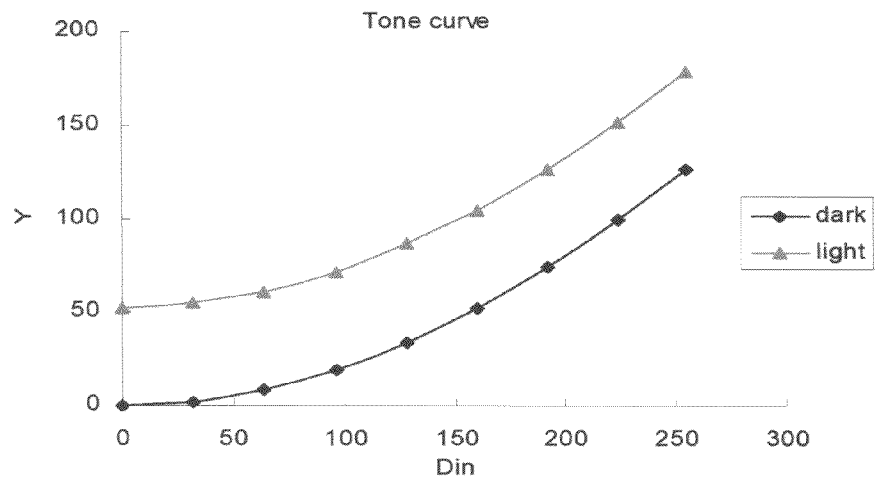
FIG. 5 shows the tone characteristics of a projector in dark and light conditions.

And similarly, we find the original LUTS stored in the projector profile don't need to be updated for the light conditions because the shapes of tone curves measured in the dark and lighting rooms are almost same as shown in FIG. 5. The tone curve in FIG. 5 is obtained based on the measured CIE tristimulus values (X, Y, Z) of grey levels in dark and lighting rooms as shown in Table 2.

S104) Color Space Transformation Parameters Calculation:

Based on the updated color values of reference images in step S104, the color space transformation parameters for the conversion operations between (R, G, B) color space and (X, Y, Z) color space will be calculated S105 by the color space transformation parameter calculator 102. The detailed conversion steps will be described in the color space transformation step S201 and color space inverse transformation step S204 later.

According to the color space transformation method disclosed by Roy S. Berns, Ricardo J. Motta, and Mark E. Gorzynski (1993) in CRT Colorimetry. Part I: Theory and Practice, Color Research and Application, 18/5: 299-314, in case of color transformation using 3*3 matrix, the color space transformation parameters (3*3 matrix) can be calculated. Firstly, intensity values of three primaries for a projector can be calculated with equation (2):

$$\begin{bmatrix} I_R \\ I_G \\ I_B \end{bmatrix} = \begin{bmatrix} x_R/y_R & x_G/y_G & x_B/y_B \\ 1 & 1 & 1 \\ z_R/y_R & z_G/y_G & z_B/y_B \end{bmatrix}^{-1} \begin{bmatrix} X_W - X_{Bk} \\ Y_W - Y_{Bk} \\ Z_W - Z_{Bk} \end{bmatrix} \quad (2)$$

Wherein $(x_R, y_R)$, $(x_G, y_G)$ and $(x_B, y_B)$ are chromaticity values of three primaries described in the updated projector profile or the default chromaticity values of three primaries. $X_W$, $Y_W$ and $Z_W$ is the white point in the dark room and calculated by using color values of black and white described in the projector profile for light condition. $X_{Bk}$, $Y_{Bk}$ and $Z_{Bk}$ are color values of black stored in the profile for dark condition. Then, color space transformation parameters (3*3 matrix) can be obtained using equation (3):

TABLE 2

X, Y, Z values of grey levels in dark and lighting room

| grey levels | Dark room | | | Lighting room | | | | | |
|---|---|---|---|---|---|---|---|---|---|
|  | | | | Original measured | | | Black corrected | | |
|  | X | Y | Z | X | Y | Z | X-X0 | Y-Y0 | Z-Z0 |
| 32 | 1.74 | 1.87 | 2.24 | 52.22 | 54.82 | 35.57 | 1.75 | 1.94 | 2.10 |
| 64 | 7.47 | 8.44 | 10.05 | 57.84 | 61.33 | 43.21 | 7.37 | 8.45 | 9.74 |
| 96 | 16.24 | 18.94 | 21.94 | 66.54 | 71.80 | 54.93 | 16.07 | 18.92 | 21.46 |
| 128 | 29.43 | 34.01 | 39.13 | 79.46 | 86.69 | 71.82 | 28.98 | 33.81 | 38.35 |
| 160 | 45.75 | 52.22 | 60.12 | 95.32 | 104.50 | 92.40 | 44.85 | 51.62 | 58.94 |
| 192 | 64.57 | 74.14 | 84.33 | 113.96 | 126.30 | 116.42 | 63.49 | 73.42 | 82.95 |
| 224 | 86.45 | 99.26 | 113.63 | 135.65 | 151.40 | 145.65 | 85.18 | 98.52 | 112.18 |
| 255 | 110.56 | 126.40 | 144.68 | 159.75 | 178.60 | 176.64 | 109.28 | 125.72 | 143.18 |

$$\begin{bmatrix} X_R & X_G & X_B \\ Y_R & Y_G & Y_B \\ Z_R & Z_G & Z_B \end{bmatrix} = \begin{bmatrix} x_R/y_R & x_G/y_G & x_B/y_B \\ 1 & 1 & 1 \\ z_R/y_R & z_G/y_G & z_B/y_B \end{bmatrix} \begin{bmatrix} I_R & 0 & 0 \\ 0 & I_G & 0 \\ 0 & 0 & I_B \end{bmatrix} \quad (3)$$

S106) Color Gamut Boundary Computation:

During the image data correction procedure in the present invention, the inputting color data will be transformed into a corresponding output color data for the projector 11. Since the displayable color gamut of the projector can be affected significantly under influence of different external lighting environments, it is necessary to include gamut mapping into the image data correction procedure. Therefore, in step S106, with the data described in the updated projector profile, the displayable color gamut of projector 11 in dark and light conditions are computed using the general gamut boundary and the gamut lookup tables can be generated. (Please refer to the gamut mapping method provided by Morovic J. and Luo M. R. in "The Fundamentals of Gamut Mapping: A Survey", Journal of Imaging Science and Technology, 45/3:283-290, 2001).

Figure 4:
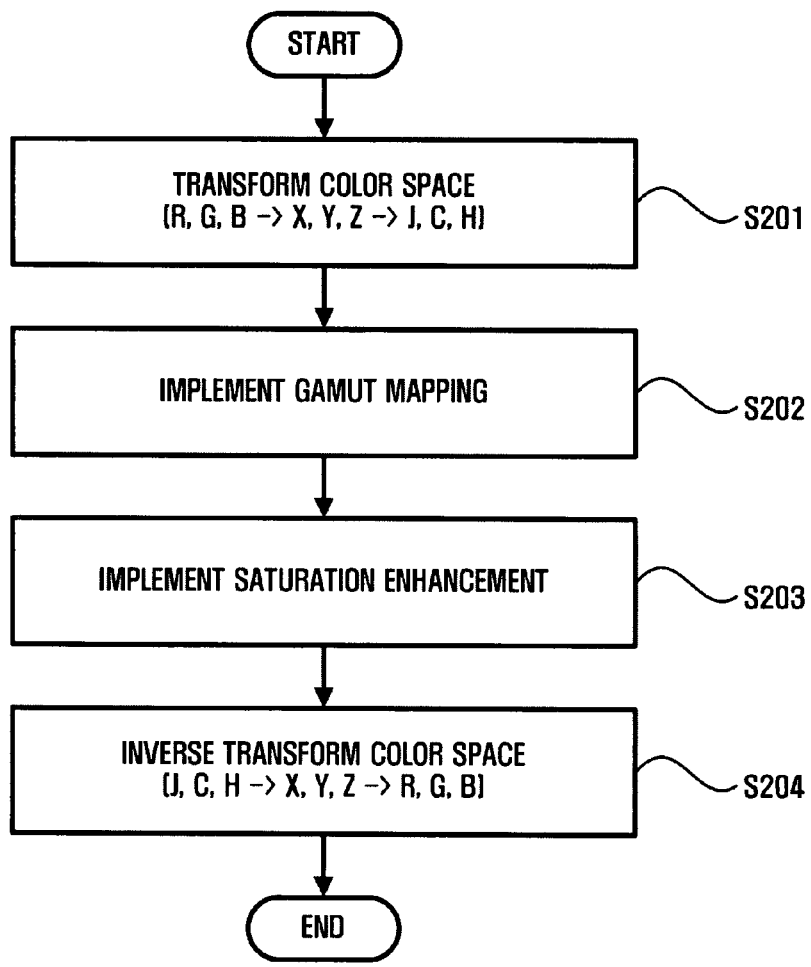
FIG. 4 is a flowchart illustrating the color correction processing for input image data in FIG. 3.

S107) Correcting Black Point in a Light Condition:

The purpose of correcting black point in a light condition is to solve the "chromatic grey" phenomenon occurred to the output image after correction. Despite the color of projection screen, colorimetric values of a black image projected on a standard projection plane in the ambient light condition are not always achromatic (For example, please refer to the measured XYZ values of black in a light condition given in FIG. 4. We can find the X, Y, Z values of black in light condition are 50.47, 52.88 and 33.47 respectively.). When the color space inverse transformation step S204 is implemented, equation (4) will be used to convert a color value $X_iY_iZ_i$ into digital output data (The detailed operation in S204 will be described later). Consequently, subtracting a "chromatic" black in the light condition (expressed as $[X_{Bk}Y_{Bk}Z_{Bk}]_{ambient\,light}$ in equation (4)) from $X_iY_iZ_i$ can result in "chromatic grey". This can be more evident when luminance of the external light is higher.

$$\begin{bmatrix} R_i \\ G_i \\ B_i \end{bmatrix} = \begin{bmatrix} X_R & X_G & X_B \\ Y_R & Y_G & Y_B \\ Z_R & Z_G & Z_B \end{bmatrix}^{-1} \left( \begin{bmatrix} X_i \\ Y_i \\ Z_i \end{bmatrix} - \begin{bmatrix} X_{Bk} \\ Y_{Bk} \\ Z_{Bk} \end{bmatrix}_{ambient\,light} \right) \quad (4)$$

Figure 6:
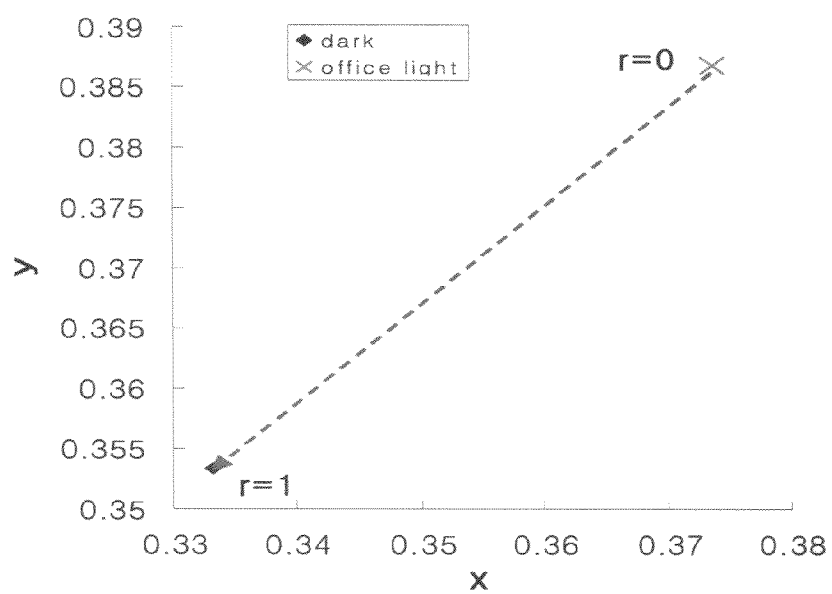
FIG. 6 is a graph showing the black point correction embodied in the method of color correction according to an embodiment of the present invention.

Preferably, in the present invention there is included a method of correcting black point in the ambient light to adjust location of this black point according to its location in the dark and light conditions. An example is given in FIG. 6. Locations of the black point measured in both dark and light conditions are shown in CIE chromaticity diagram as in FIG. 6. According to the method embodied in the present invention, black point in the ambient light can be adjusted along the line between the measured black point in the dark and that in the light condition. Computational equations of black point correction method embodied in the present invention are expressed as follows.

$$dx = x_{Bk,am} - x_{Bk,dark}$$

$$dy = y_{Bk,am} - y_{Bk,dark} \quad (5)$$

$$x_{Bk,adjusted} = x_{Bk,am} - r \times dx$$

$$y_{Bk,adjusted} = y_{Bk,am} - r \times dy \quad (6)$$

Wherein r is a parameter introduced in the present invention to adjust the location of black point in the light condition. Its value can be set between 0 and 1 according to the projector used. FIG. 6 shows that there will be no correction when r is set to 0, i.e. the measured chromaticity value of black point in the light condition ($x_{Bk,am}$, $y_{Bk,am}$) will be used directly. When r is set to 1, the chromaticity value of black point in the light condition will take of the black point in the dark room ($x_{Bk,dark}$, $y_{Bk,dark}$) Different projector can have different r being set by manufacturer so as to avoid the "chromatic grey" phenomenon. In the present embodiment, r was set to 1.

Note that the luminance values of black in the light condition remains the same as those stored in the updated projector profile. According to the ($x_{Bk,adjusted}$, $y_{Bk,adjusted}$) values and the luminance values of black, the values of $[X_{Bk}Y_{Bk}Z_{Bk}]_{adjusted}$ can be calculated to be used in equation (4).

On balance, through steps S101 to S107, the color correction information in a particular ambient light has been calculated and prepared before processing and correcting the input image data. Subsequently, the system will begin to implement image data correcting on the input image data through steps S201-S204.

Part II Image Data Correction

S201) Color Space Transformation

In step S201, the digital $R_1$, $G_1$, $B_1$ values for each pixel in the input image are first transformed into apparatus independent colorimetric values $X_{i1}$, $Y_{i1}$, $Z_{i1}$ with LUTs described in the projector profile and color transformation parameters calculated from step S104.

Firstly, convert digital $R_1$, $G_1$, $B_1$ values ($dR_i$, $dG_i$, $dB_i$ in the followed equation) into intensity values ($I_R$ $I_G$ $I_B$) using equation (7):

$$\begin{bmatrix} I_R \\ I_G \\ I_B \end{bmatrix} = \begin{bmatrix} (dR_i)^{LUT\_R} \\ (dG_i)^{LUT\_G} \\ (dB_i)^{LUT\_B} \end{bmatrix} \quad (7)$$

Then, convert $$\begin{bmatrix} I_R \\ I_G \\ I_B \end{bmatrix}$$

into $X_{i1}$, $Y_{i1}$, $Z_{i1}$ values using equation (8):

$$\begin{bmatrix} I_R \\ I_G \\ I_B \end{bmatrix} = \begin{bmatrix} X_R & X_G & X_B \\ Y_R & Y_G & Y_B \\ Z_R & Z_G & Z_B \end{bmatrix} \left( \begin{bmatrix} X_i \\ Y_i \\ Z_i \end{bmatrix} - \begin{bmatrix} X_{Bk} \\ Y_{Bk} \\ Z_{Bk} \end{bmatrix}_{dark} \right) \quad (8)$$

Subsequently, in this step, the $X_{i1}$, $Y_{i1}$, $Z_{i1}$ values for each pixel will be transferred to human's perceptual attributes (color appearance attributes). In 1997, the CIE recommended an interim color appearance model CIECAM97s, for predicting corresponding color appearance to achieve color appearance attributes. In 2002, CIECAM02 was adopted by the CIE. This is a new revision of CIECAM97s that improves its accuracy performance and simplifies the structure of the model. In the present invention. We use CIECAM02 (Please refer to http://www.color.org/tc8-01/for detailed explanation for CIECAM02) to further convert $X_{i1}$, $Y_{i1}$, $Z_{i1}$ values to $J_{i1}$, $C_{i1}$, $H_i$, $Sat_i$ values, wherein J for lightness, C for chroma, H for hue composition, Sat for Saturation. And the viewing condition parameters for the above CIECAM02 space transformation take these set for dark surround in this step. However, if required, the present invention can also apply any other uniform color space, such as CIELAB etc.

S202) Gamut Mapping

Since the black level of projector increases with the influence of external light, color gamut of projector in the light condition is decreased comparing to that under dark condition. The output values from step S201 which represent a color within the gamut of projector in the dark room need to be mapped into the gamut of projector in the light condition in step S202. Various gamut mapping methods can be applied in this step. In order to preserve image contrast and constant hue, the sigmoidal lightness rescaling function provided by Gustav can be used (Gustav J. Braun and Mark D. Fairchild, Image Lightness Rescaling Using Sigmoidal Contrast Enhancement Functions, Journal of Electronic Imaging, 8, 1999, which can be downloaded from http://citeseer.ist.psu.edu/246774.html). The output values from S2 are lightness ($Ji_2$), chroma ($C_{i2}$), hue ($H_i$), saturation ($Sat_i$). Please be noted in this step, we update the lightness and chroma value with $J_{i2}$, $C_{i2}$, while the saturation values $Sat_i$ remains unchanged.

S203) Saturation Enhancement

Gamut mapping in S202 can result in higher lightness and lower chroma values to the transformed color. Consequently, saturation of the color reduces significantly, which induces a bad image quality. Therefore, it is preferable to include a saturation enhancement operation in the present invention. The definition of saturation can be defined as equation (9) given below [M. D. Fairchild, Color Appearance Models (2nd edition), p 90]:

$$Saturatoin = \frac{Chroma}{Lightness} \quad (9)$$

Therefore, it is possible to adjust lightness of a color so as to increase saturation especially when the range of chroma is limited. In general, lightness can be gamma corrected. A traditional method of reducing lightness of an image is to correct the gamma of each color on the image by a same value, i.e. global gamma correction. However, this traditional method reduces lightness of both non-saturated colors and saturated colors simultaneously. As the result, the overall image brightness appears darker. This method may not be preferred especially by grey images.

In the present invention, the new saturation enhancement method proposed is a local gamma correction method, wherein the gamma value applied to each color will be determined by saturation of the color on the original image before gamut mapping. The proposed saturation enhancement method is expressed as follows.

$$gamma = a \times Sat^2 + b \times Sat + c \quad (10)$$

$$J_{en} = J^{gamma} \quad (11)$$

Wherein a, b and c are constants and their values can be set differently according to the projector applied. Equation (10) can also be expressed as a linear function, in other words, a can be 0. In the present embodiment, constants a, b and c were set to 0, 0.0075 and 1. In general, value of the gamma in equation (10) and (11) must be greater than 1, so the lightness can be decreased (Please be noted that the lightness values are normalized between 0 and 1). $J_{en}$ indicates the lightness after gamma correction ($J_{3i}$), and J is the original lightness of the color after gamut mapping ($J_{2i}$), Sat indicates the original saturation value ($S_i$).

Therefore, with the saturation enhancement method embodied in the present invention, gamma correction will be applied less to these colors having smaller saturation. Thus, the overall brightness of the image after color correction will not be over adjusted. The output data from S203 consists of the gamma corrected lightness value $J_{3i}$, chroma $C_{2i}$ and hue H.

S204) Color Space Inverse Transformation

In the last step, the values ($J_{3i}$, $C_{2i}$, H) of each pixel will be transformed into digital RGB signals. The whole step of S204 is similar to S201.

Firstly, the previous obtained color attributes lightness $J_{3i}$, chroma $C_{2i}$ and hue H of a color are transferred into the colorimetric value XYZ by means of the inverse color appearance model same as in S201. In case of CIECAM02, viewing condition parameters take these of the average surround. The adopted white point calculated using equation (12) is taken as adopted white point, in other words, the adopted white point is also adjusted by the black point corrected by the step S107.

$$\begin{bmatrix} X_w \\ Y_w \\ Z_w \end{bmatrix}_{adp.} = \begin{bmatrix} X_w \\ Y_w \\ Z_w \end{bmatrix}_{dark} + \begin{bmatrix} X_{Bk} \\ Y_{Bk} \\ Z_{Bk} \end{bmatrix}_{adjusted} \quad (12)$$

Then the XYZ values will be transformed to digital output values $R_{2i}$, $G_{2i}$ and $B_{2i}$ S108 using color transformation parameters calculated in step S105 and LUTs described in the projector profile, and the black point corrected in S107 as followed:

$$\begin{bmatrix} I_R \\ I_G \\ I_B \end{bmatrix} = \begin{bmatrix} X_R & X_G & X_B \\ Y_R & Y_G & Y_B \\ Z_R & Z_G & Z_B \end{bmatrix}^{-1} \left( \begin{bmatrix} X_i \\ Y_i \\ Z_i \end{bmatrix} - \begin{bmatrix} X_{Bk} \\ Y_{Bk} \\ Z_{Bk} \end{bmatrix}_{adjusted} \right) \quad (13)$$

$$\begin{bmatrix} I_R \\ I_G \\ I_B \end{bmatrix} = \begin{bmatrix} (dR_i)^{LUT\_R} \\ (dG_i)^{LUT\_G} \\ (dB_i)^{LUT\_B} \end{bmatrix} \quad (14)$$

Wherein in the color space inverse transformation step, $X_i$, $Y_i$, $Z_i$ in equation indicate the $X_{2i}$, $Y_{2i}$, $Z_{2i}$ respectively. The digital R, G, B values ($R_{2i}$, $G_{2i}$ and $B_{2i}$) can be calculated accordingly. And the output digital values $R_{2i}$, $G_{2i}$ and $B_{2i}$ can be either sent to projector 11 directly or processed by means of any contrast enhancement method before they are sent to projector 11.

Figure 7:
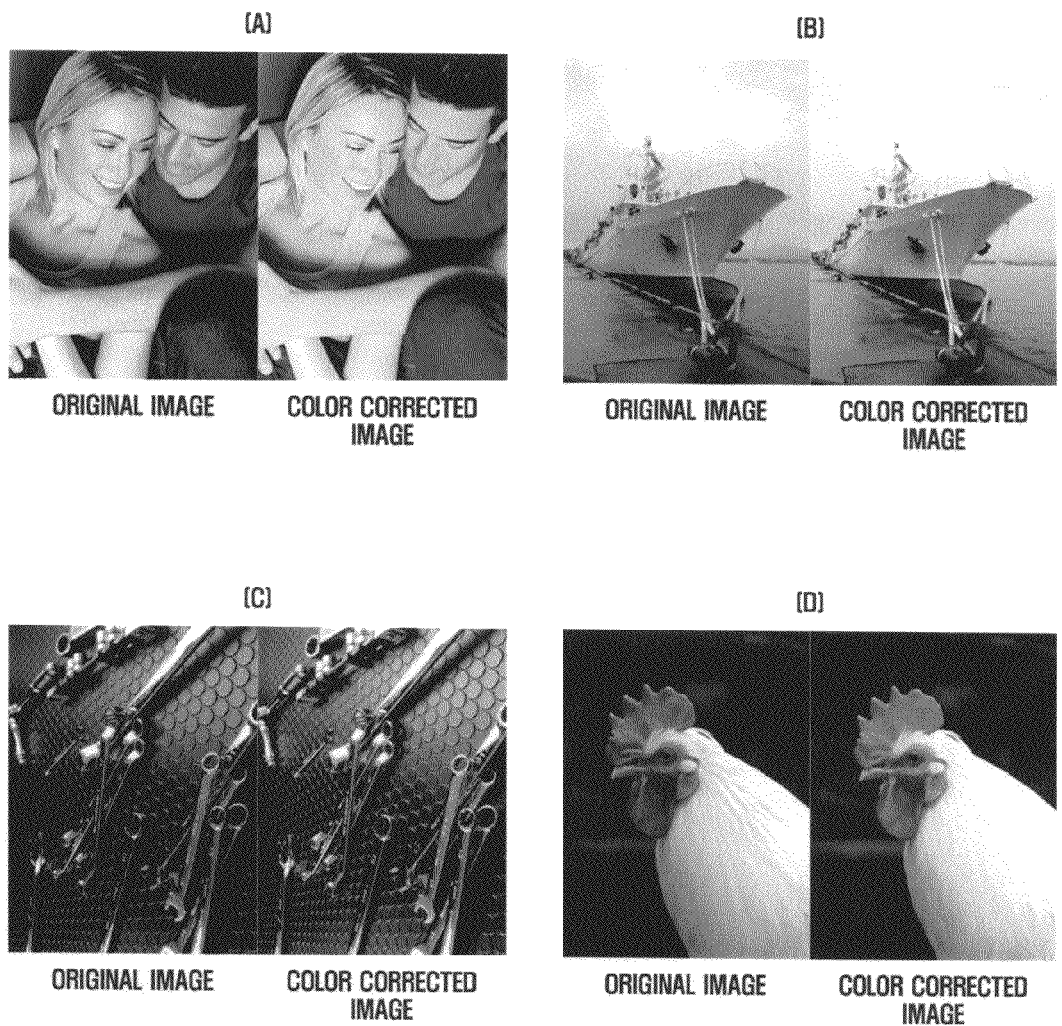
FIG. 7 shows four pairs of experimental images before correction and after correction in light conditions.

Finally, four colorful images have been color corrected to evaluate the color correction method and system of the present invention. The input images are corrected through the color correction projection system according to the embodiment in the present invention. For each pair of the images shown in FIG. 7, the images without any correction are on the left and the images with color correction are on the right. Color correction to these images was conducted according to the color information measured in a normal office environment. Obviously the corrected images are brighter than the images without correction.

Also, when they are all projected on a typical projection plane in an office environment, with the color correction projector system designed in the present invention, the output image displayed on the projection plane 2 with influence of ambient light will have a close color appearance to that in the dark room. Particularly, an image with accurate hue and relative brighter luminance can be achieved.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described embodiments have been provided only in a descriptive sense and will not be construed as placing any limitation on the scope of the invention.

What is claimed is:

1. An apparatus for ambient light adaptive color correction, the apparatus comprising:
    a color information sensor for measuring color information of at least a black reference image and a white reference image on a projector plane with influence of ambient light;
    a color correction information calculator for calculating color correction information for color appearance matching and gamut mapping based on the measured color information and a projector profile; and
    an image data correction unit for processing an input image according to the color correction information to produce a corrected-color image to be outputted to the projector.

2. The apparatus of claim 1, wherein the projector profile comprises lookup tables of the projector and default color values of three primaries and color values of black in a dark room or desired target environment.

3. The apparatus of claim 2, wherein the color information sensor measures the color information of black and white reference images with influence of ambient light, and the color correction information calculator calculates the color correction information based on the measured black and white color values and default red, green and blue color values stored in the projector profile.

4. The apparatus of claim 2, wherein the color information sensor measures the color information of black, white, red, green and blue reference images with influence of ambient light, and the color correction information calculator calculates the color correction information based on the above measured color values.

5. The apparatus of claim 1, wherein the color correction information calculator comprises a means for calculating color space transformation parameters; and
    a means for computing gamut boundary; and
    the image data correction unit comprises a means for color space transformation which transforms the color of input image from RGB values to color appearance values;
    a means for gamut mapping which converse the color appearance values with gamut in a dark room to the color appearance values with gamut in a lighting room;
    a means for color space inverse transformation which transforms the corrected color appearance values to RGB values for outputting to the projector.

6. The apparatus of claim 5, wherein the color correction information calculator further comprises a means for black point correction in the ambient light,
    and the means for color space inverse transformation transforms the corrected color appearance values to RGB values based on the corrected black point in the ambient light.

7. The apparatus of claim 6, wherein the means for black point correction corrects the black point in ambient light with the followed equation:

$$x_{Bk,adjusted} = x_{Bk,am} - r \times (x_{Bk,am} - x_{Bk,dark})$$

$$y_{Bk,adjusted} = y_{Bk,am} - r \times (y_{Bk,am} - y_{Bk,dark})$$

Here, $(x_{Bk,am}, y_{Bk,am})$ indicate the color values of black ambient ilght, $(x_{Bk,dark}, y_{Bk,dark})$ indicate the color values of black in dark room, $(x_{Bk,adjusted}, y_{Bk,adjusted})$ indicate the color values of black after adjustment, and r can be set between 0 and 1; the luminance value of black in ambient light remains unchanged.

8. The apparatus of claim 5, wherein the image data correction unit further comprises a means for saturation enhancement to enhance the saturation by adjusting lightness value of a color.

9. The apparatus of claim 8, wherein the lightness is adjusted by a local gamma correction method.

10. The apparatus of claim 9, wherein the local gamma correction method can be expressed as:

$$\text{gamma} = a \times \text{Sat}^2 + b \times \text{Sat} + c$$

Here, a, b and c are constants and their values can be set according to the projector applied as long as the gamma value is ensured to be greater than 1; $J_{en}$ indicates the lightness after gamma correction, and J is the lightness of the color after gamut mapping, Sat indicates the original saturation value before gamut mapping.

11. A method for ambient light adaptive color correction, the method comprising:
    measuring color information of at least a black reference image and a white reference image on a projector plane with influence of ambient light;
    calculating color correction information for color appearance matching and gamut mapping based on the measured color information and a projector profile; and
    processing an input image according to the color correction information to produce a corrected-color image to be outputted to the projector.

12. The method of claim 11, wherein the projector profile comprises lookup tables of the projector and default color values of three primaries and color values of black in a dark room or desired target environment.

13. The method of claim 12, wherein the measuring comprises measuring the color information of black and white reference images with influence of ambient light, and the calculating comprises calculating the color correction information based on the measured black and white color values and default red, green and blue color values in the projector profile.

14. The method of claim 12, wherein the measuring comprises measuring the color information of black, white, red, green and blue reference images with influence of ambient light, and the calculating comprises calculating the color correction information based on the above measured color values.

15. The method of claim 11, wherein the calculating comprises calculating color space transformation parameters; and
    computing color gamut boundary; and
    the processing comprises transforming the color of input image from RGB values to color appearance values;
    conversing the color appearance values with gamut in a dark room to the color appearance values with gamut in a lighting room; and
    transforming the corrected color appearance values to RGB values for outputting to the projector.

16. The method of claim 15, wherein the calculating further comprises correcting black point in the ambient light,
and the processing comprises transforming the corrected color appearance values to RGB values based on the corrected black point in the ambient light.

17. The method of claim 16, wherein, the black point for correction with influence of ambient light can be calculated with the followed equation:

$$x_{Bk,adjusted} = x_{Bk,am} - r \times (x_{Bk,am} - x_{Bk,dark})$$

$$y_{Bk,adjusted} = y_{Bk,am} - r \times (y_{Bk,am} - y_{Bk,dark})$$

Here, $(x_{Bk,am}, Y_{Bk,am})$ indicate the color values of black in ambient light, $(X_{Bk,dark}, Y_{Bk,dark})$ indicate the color values of black in dark room, $(X_{Bk,adjusted}, Y_{Bk,adjusted})$ indicate the color value of black after adjustment, and r can be set between 0 and 1; the luminance value of black in ambient light remains unchanged.

18. The method of claim 11, wherein the calculating comprises calculating color space transformation parameters; and computing color gamut boundary; and
the processing comprises transforming the color of input image from RGB values to color appearance values;
mapping the color appearance values with gamut in the dark room to the color appearance values with gamut in a lighting room;
enhancing the saturation by adjusting lightness value of a color; and
transforming the corrected color appearance values to RGB values for outputting to a projector.

19. The method of claim 18, wherein, the lightness is adjusted by a local gamma correction method.

20. The method of claim 19, wherein the local gamma correction method can be expressed as:

$$\text{gamma} = a \times \text{Sat}^2 + b \times \text{Sat} + c$$

$$J_{en} = J^{gamma}$$

Here, a, b and c are constants and their values can be set according to the projector applied as long as the gamma value is ensured to be greater than 1, $J_{en}$ indicates the lightness after gamma correction, and J is the lightness of the color after gamut mapping, Sat indicates the original saturation value before gamut mapping.

21. The method of claim 20, wherein the calculating further comprises correcting black point in the ambient light, and the processing comprises transforming the corrected color appearance values to RGB values based on the corrected black point in the light condition.

22. The method of claim 21, wherein the black point for correction can be calculated with the followed equation:

$$x_{Bk,adjusted} = x_{Bk,am} - r \times (x_{Bk,am} - x_{Bk,dark})$$

$$y_{Bk,adjusted} = y_{Bk,am} - r \times (y_{Bk,am} - t_{Bk,dark})$$

Here, $(x_{Bk,am}, y_{Bk,am})$ indicate the color values of black in ambient light, $(x_{Bk,dark}, y_{Bk,dark})$ indicate the color values of black in dark room, $(x_{Bk,adjusted}, y_{Bk,adjusted})$ indicate the color value of black after adjustment, and r can be set between 0 and 1; the luminance value of black in ambient light remains unchanged.

23. The method of claim 22, preferably, r=1.

24. The method of claim 22, preferably, a=0, b=0.0075, c=1.

25. The method for ambient light adaptive color correction, the method comprising:
measuring color information of reference images on a projector plane with influence of ambient light;
calculating luminance ration between dark and light conditions, and if the luminance ration is greater than a threshold, users will be notified and the procedure will be terminated, otherwise the procedure will be continued with calculating color correction information;
calculating color correction information for color appearance matching and gamut mapping based on the measured color information and a projector profile; and
processing an input image to produce a corrected-color image to be outputted to the projector according to the color correction information;
wherein the reference images comprise at least a black reference image and a white reference image.

26. The method of claim 25, wherein, the luminance ratio can be calculated with the followed equation:

$$\text{luminance ratio} = Lwc/Lw$$

here Lwc indicates the luminance of white image in the light condition, and Lw indicates the luminance of white image in the dark room, which can be calculated by subtracting the luminance of black image in the light condition from the luminance of white image in light condition.

* * * * *

UNITED STATES PATENT AND TRADEMARK OFFICE
CERTIFICATE OF CORRECTION

PATENT NO. : 8,243,210 B2  
APPLICATION NO. : 11/878783  
DATED : August 14, 2012  
INVENTOR(S) : Han Bing et al.

Page 1 of 1

It is certified that error appears in the above-identified patent and that said Letters Patent is hereby corrected as shown below:

In the Claims:

Column 12, Line 8, In Claim 7, after "black" insert -- in --.
Column 12, Line 9, In Claim 7, delete "ilght," and insert -- light, --, therefor.
Column 12, Line 23 (Approx.); In Claim 10, before "Here," insert -- $J_{en}^{-}J^{gamma}$ --.
Column 13, Line 10 (Approx.); In Claim 17, delete " $X_{Bk,adjusted} - X_{Bk,am}$ " and insert -- $X_{Bk,adjusted} = X_{Bk,am}$ --, therefor.
Column 13, Line 14, In Claim 17, delete " $(X_{Bk,dark}Y_{Bk,dark})$ " and insert -- $(X_{Bk,dark}, Y_{Bk,dark})$ --, therefor.
Column 13, Line 38 (Approx.); In Claim 20, delete " $J_{en}^{-j\cdot gamma\cdot}$ " and insert -- $J_{en}^{-}J^{gamma}$ --, therefor.
Column 14, Line 9 (Approx.); In Claim 22, delete " $(y_{Bk,am} - t_{Bk,dark})$ " and insert -- $(y_{Bk,am} - y_{Bk,dark})$ --, therefor.
Column 14, Line 11 (Approx.); Claim 22, delete " $(x_{Bk,dark}) Y_{Bk,dark})$ " and insert -- $(X_{Bk,dark}, Y_{Bk,dark})$ --, therefor.
Column 14, Line 22, In Claim 25, delete "ration" and insert -- ratio --, therefor.
Column 14, Line 23, In Claim 25, delete "ration" and insert -- ratio --, therefor.

Signed and Sealed this  
Fourteenth Day of May, 2013

Teresa Stanek Rea  
*Acting Director of the United States Patent and Trademark Office*